(12) United States Patent
Heinbokel

(10) Patent No.: US 8,186,171 B2
(45) Date of Patent: May 29, 2012

(54) METHOD FOR CONTROLLING HIGH-PRESSURE IN AN INTERMITTENTLY SUPERCRITICALLY OPERATING REFRIGERATION CIRCUIT

(75) Inventor: Bernd Heinbokel, Cologne (DE)

(73) Assignee: Carrier Corporation, Farmington, CT (US)

( * ) Notice: Subject to any disclaimer, the term of this patent is extended or adjusted under 35 U.S.C. 154(b) by 787 days.

(21) Appl. No.: 11/816,542

(22) PCT Filed: Feb. 18, 2005

(86) PCT No.: PCT/EP2005/001720
§ 371 (c)(1),
(2), (4) Date: Oct. 22, 2007

(87) PCT Pub. No.: WO2006/087005
PCT Pub. Date: Aug. 24, 2006

(65) Prior Publication Data
US 2008/0264077 A1 Oct. 30, 2008

(51) Int. Cl.
*F25B 41/04* (2006.01)
(52) U.S. Cl. .................. 62/222; 62/224; 62/225
(58) Field of Classification Search .......... 62/114, 62/222, 224, 225
See application file for complete search history.

(56) References Cited

U.S. PATENT DOCUMENTS 1,860,447 A   5/1932  Bergdoll
6,817,193 B2  11/2004 Caesar et al.

FOREIGN PATENT DOCUMENTS

| JP | 2001066003 A | * | 3/2001 |
| WO | 93/06423 A1 | | 4/1993 |
| WO | 00/68621 A1 | | 11/2000 |
| WO | 03/019085 A1 | | 3/2003 |

OTHER PUBLICATIONS

English translation of paragraphs [0017]-[0019] in Japanese Patent 2001-066003.*
Patent Abstracts of Japan, vol. 2000, No. 20, Jul. 10, 2001, JP 2001 066003A (Zexel Valeo Climate Control Corp.) Mar. 16, 2001.
Patent Abstracts of Japan, vol. 2000, No. 21, Aug. 3, 2001, JP 2001 116400A (Zexel Valeo Climate Control Corp.) Apr. 27, 2001.
Patent Abstracts of Japan, vol. 2000, No. 12, Jan. 3, 2001, JP 2000 241048A (Saginomiya Seisakusho Inc.) Sep. 8, 2000.
Patent Abstracts of Japan, vol. 2000, No. 10, Nov. 17, 2000, JP 2000 186870A (Saginomiya Seisakusho Inc.) Jul. 4, 2000.
Patent Abstracts of Japan, vol. 2000, No. 23, Feb. 10, 2001, JP 2001 153499A (Saginomiya Seisakusho Inc.) Jun. 8, 2001.
Vanna Casson et al., Optimisation of the Throttling System in a CO2 Refrigerating Machine, International Journal of Refrigeration, Dec. 8, 2003, pp. 926-935, vol. 26, No. 8.

* cited by examiner

*Primary Examiner* — Cheryl J Tyler
*Assistant Examiner* — Jonathan Bradford
(74) *Attorney, Agent, or Firm* — Bachman & LaPointe, P.C.

(57) ABSTRACT

A method is provided for controlling an intermittently supercritically operating refrigeration circuit. A control valve (12) is controlled: (a) in the subcritical mode, so that a predetermined "subcritical pressure" ensuring a predetermined subcooling of the liquid refrigerant at the outlet (14) of a heat-rejecting heat exchanger (10) is maintained; (b) in the supercritical mode, so that a predetermined "supercritical pressure", which is optimized for optimum efficiency, of the supercritical refrigerant at the outlet (14) of the heat-rejecting heat exchanger (10) is maintained; and (c) in a border mode in a border region next to the critical point, dependent on a "continuity pressure" which is determined on the basis of the predetermined "subcritical pressure" and the predetermined "supercritical pressure" of steps (a) and (b).

21 Claims, 3 Drawing Sheets

METHOD FOR CONTROLLING HIGH-PRESSURE IN AN INTERMITTENTLY SUPERCRITICALLY OPERATING REFRIGERATION CIRCUIT

BACKGROUND OF THE INVENTION

The present invention relates to a method for controlling high-pressure of a refrigerant in an intermittently supercritically operating refrigeration circuit which circulates in use a refrigerant in a predetermined flow direction and which comprises in flow direction a compressor, a heat-rejecting heat exchanger, a control valve associated to the outlet of the heat-rejecting heat exchanger and a control for controlling the control valve.

Various methods for controlling the high-pressure in the refrigerant subsequent to the heat-rejecting heat exchanger, i.e. the gas cooler and/or the condenser, in a subcritical as well as a super critical operational condition are known. A float regulation valve is for example a well-known device for high-pressure regulation in a subcritically operating refrigeration circuit. Depending on the liquid level in the float-regulating valve, the float opens or closes an outlet opening for tapping liquid refrigerant into the refrigeration circuit, and typically to a receiver in which the refrigerant is collected and stored before its delivery to the refrigeration consumer(s). Gaseous refrigerant on the other hand will not lift the float so that the outlet opening will remain closed. Accordingly, the liquifying pressure in the heat-rejecting heat exchanger will be raised ensuring delivery of fluid refrigerant to the float-regulating valve.

In the supercritical operational mode no liquid refrigerant will be present subsequent to the heat-rejecting heat exchanger and the float-regulating valve cannot effect a high-pressure regulation. In the supercritical mode exists, however, a correlation between gas cooler outlet temperature and high-pressure of the refrigerant for which the COP (coefficient of performance) is at a maximum. The respective formula for calculating such optimum high-pressure in the supercritical mode is known to the person skilled in the art, and by means of a control valve associated to the outlet of the heat-rejecting heat exchanger and gas cooler, respectively, the refrigerant pressure can be controlled based on this formula.

Intermittently supercritically operating refrigeration circuits, for example with $CO_2$ as refrigerant, operate intermittently in a supercritical operational mode, with the refrigerant exiting the gas cooler being in the gaseous state. They also intermittently operate in a subcritical or "normal" mode where the refrigerant exiting the condenser is in the fluid state. Whether the refrigeration circuit operates in the supercritical or in the subcritical mode depends on the temperature of the medium against which the refrigerant is cooled and condensed, respectively, in the heat-rejecting heat exchanger. As such medium is typically ambient air, the subcritical operational mode is also referred to as the "winter mode", while the supercritical operational mode is also referred to as the "summer mode". Alternative media may be water or brine.

The control of the high-pressure of the refrigerant in the border region next to the critical point where the supercritical operational mode transfers to the subcritical operational mode and vice versa is a problem with such refrigeration circuits.

SUMMARY OF THE INVENTION

Accordingly, it is an object of the present invention to provide a method for controlling an intermittently supercritically operating refrigerant circuit in a border region next to the critical point.

In accordance with an embodiment of the present invention this object is solved by the following steps:
(a) in the subcritical mode, controlling the control valve so that a predetermined "subcritical pressure" ensuring a predetermined subcooling of the liquid refrigerant at the outlet of the heat-rejecting heat exchanger is maintained;
(b) in the supercritical mode, controlling the control valve so that a predetermined "supercritical pressure" which is optimized for optimum efficiency, of the supercritical refrigerant at the outlet of the heat-rejecting heat exchanger is maintained; and
(c) in a border mode in a border region next to the critical point, controlling the control valve dependent on a "continuity pressure" which is determined on the basis of the predetermined "subcritical pressure" and the predetermined "supercritical pressure" of steps (a) and (b).

In accordance with the present invention, a control valve controls the high-pressure for the subcritical mode, the supercritical mode, as well as the border mode. In the supercritical mode the control controls the control valve substantially as with the prior art, i.e. on the basis of the known correlation for optimum efficiency, possibly adjusted by a coefficient taking into account the particular type of heat-rejecting heat exchanger; so that the optimum efficiency or nearly the optimum efficiency for the refrigeration circuit is achieved. In the subcritical mode the control controls the control valve similar to the float-regulating valve so that only liquid refrigerant will be admitted through the control valve. A pre-determined subcooling of the liquid refrigerant at the outlet of the heat-rejecting heat exchanger is provided in order to ensure that liquid refrigerant will be permitted through the control valve.

While the control in the supercritical mode and the subcritical mode is relatively conventional, problems mainly exist in the border region around the critical point, i.e. the transition between subcritical and supercritical operation. The respective calculations of the subcritical pressure and the supercritical pressure for the critical point can vary substantially. In effect, a slight shift of the parameters, for example the temperature of the refrigerant, etc., can result in a substantial pressure step, resulting in irregularities and discontinuities in the control of the control valve. In order to address this, a border region around or next to the critical point is defined for control purposes and a "continuity pressure" is calculated and/or defined on the basis of the predetermined "subcritical pressure" and the predetermined "supercritical pressure". Accordingly, the thus determined "continuity pressure" serves to continuously connect the subcritical pressure with the supercritical pressure. Thus, a continuous control of the control valve and the refrigerant pressure, respectively, can be effected even in the vicinity of the critical point.

In accordance with an embodiment of the present invention, the continuous pressure is determined in step (c) by determining the "subcritical pressure" and the "supercritical pressure" for the particular operational condition in accordance with steps (a) and (b) and selecting the higher pressure of "subcritical pressure" and the "supercritical pressure". This particular solution involves the calculation of the "subcritical pressure" and/or the "supercritical pressure" beyond the critical point in the supercritical region and the subcritical region, respectively. While the respective calculations do not make sense under physical aspects, the respective values can nevertheless be used for controlling the control valve and thus the high-pressure at the heat-rejecting heat exchanger outlet. The respective values can either be calculated in "real time", but can also be based on earlier calculations and stored for example as look-up tables in a memory. This method is particularly preferred if there is an intersection between the pressure curve for the supercritical pressure and pressure curve for the subcritical pressure near the critical pressure range, i.e. within the border region as defined for this particular application.

In accordance with another preferred embodiment of the present invention, the continuity pressure is determined in step (c) on the basis of an interpolation for the pressure values within the border region between the "subcritical pressure" at the lower limit of the border region as defined and the "supercritical pressure" at the upper limit of the border region. The interpolation can be of the best fit type, attempting to conform as close as possible to the curves of the supercritical pressure and the subcritical pressure, respectively, in this region where applicable. It is also possible to simply connect the "subcritical pressure" at the lower limit of the border region and the "supercritical pressure" at the upper limit of the border region by a straight line. The border region does not necessarily have to be symmetrical around the critical point. The border region can also be completely on one side of the critical point.

In accordance with an embodiment of the present invention, step (a) comprises determining the "subcritical pressure" based on the temperature and the characteristics of the refrigerant and by taking into account a sub-cooling of the refrigerant as compared to the saturation pressure.

In accordance with an embodiment of the present invention, the sub-cooling of the refrigerant as compared to the saturation pressure is up to 10 Kelvin and preferably between 2 Kelvin and 6 Kelvin sub-cooling.

In accordance with an embodiment of the present invention, the "supercritical pressure" is determined in step (b) based on the temperature of the refrigerant so that the coefficient of performance of the refrigeration circuit is substantially at an optimum. As mentioned above, for each temperature at the outlet of the heat-rejecting heat exchanger a particular pressure can be determined which will result in the optimum COP. The respective formula is known in the particular field and it is preferred to calculate the high-pressure in the supercritical region based on such formula. The temperature at the outlet of the heat-rejecting heat exchanger can be measured with well-known devices, for example thermocouples and other temperature sensors. There is no need to measure the precise temperature, but it suffices to measure any value indicating the temperature and taking the relationship of such value to the correct temperature into account when calculating or determining the respective pressure.

In accordance with an embodiment of the present invention, the control valve is a pressure-regulating valve and dependent on the operational mode, the respective one of the "subcritical pressure", the "continuity pressure" and the "supercritical pressure" controls the operation of the pressure-regulating valve.

The present invention also relates to a refrigeration circuit for circulating a refrigerant in a predetermined flow direction, comprising in flow direction a compressor, a heat-rejecting heat exchanger, a control valve associated to the outlet of the heat-rejecting heat exchanger and the control which is adapted to control the control valve:

(a) in the subcritical mode, so that a predetermined "subcritical pressure" ensuring a predetermined subcooling of the liquid refrigerant at the outlet ( ) of the heat-rejecting heat exchanger ( ) is maintained;
(b) in the supercritical mode, so that a predetermined "supercritical pressure" which is optimized for optimum efficiency, of the supercritical refrigerant at the outlet ( ) of the heat-rejecting heat exchanger ( ) is maintained; and
(c) in a border mode in a border region next to the critical point, dependent on a "continuity pressure" which is determined on the basis of the predetermined "subcritical pressure" and the predetermined "supercritical pressure" of (a) and (b).

The control may either calculate the respective pressures based on the relevant values, like the refrigerant characteristics, temperature, etc. on an actual basis. Alternatively, the respective pressures can be determined on the basis of values stored in the memory of such control, like look-up tables, etc. It is also possible to use a combination of actual calculation with stored values.

The control may be integrated with the control valve. It is also possible to integrate the control of the control valve to the main control of the refrigeration circuit.

The present invention further relates to a refrigeration apparatus comprising a refrigeration circuit in accordance with an embodiment of the present invention and/or operating with the method of an embodiment of the present invention. The refrigeration apparatus can be a refrigeration system for a supermarket for providing refrigeration to display cabinets, etc. or an industrial refrigeration system, etc.

BRIEF DESCRIPTION OF THE DRAWINGS

Embodiments of the present invention are described in greater detail below with reference to the Figures, wherein.

DETAILED DESCRIPTION

Figure 1:
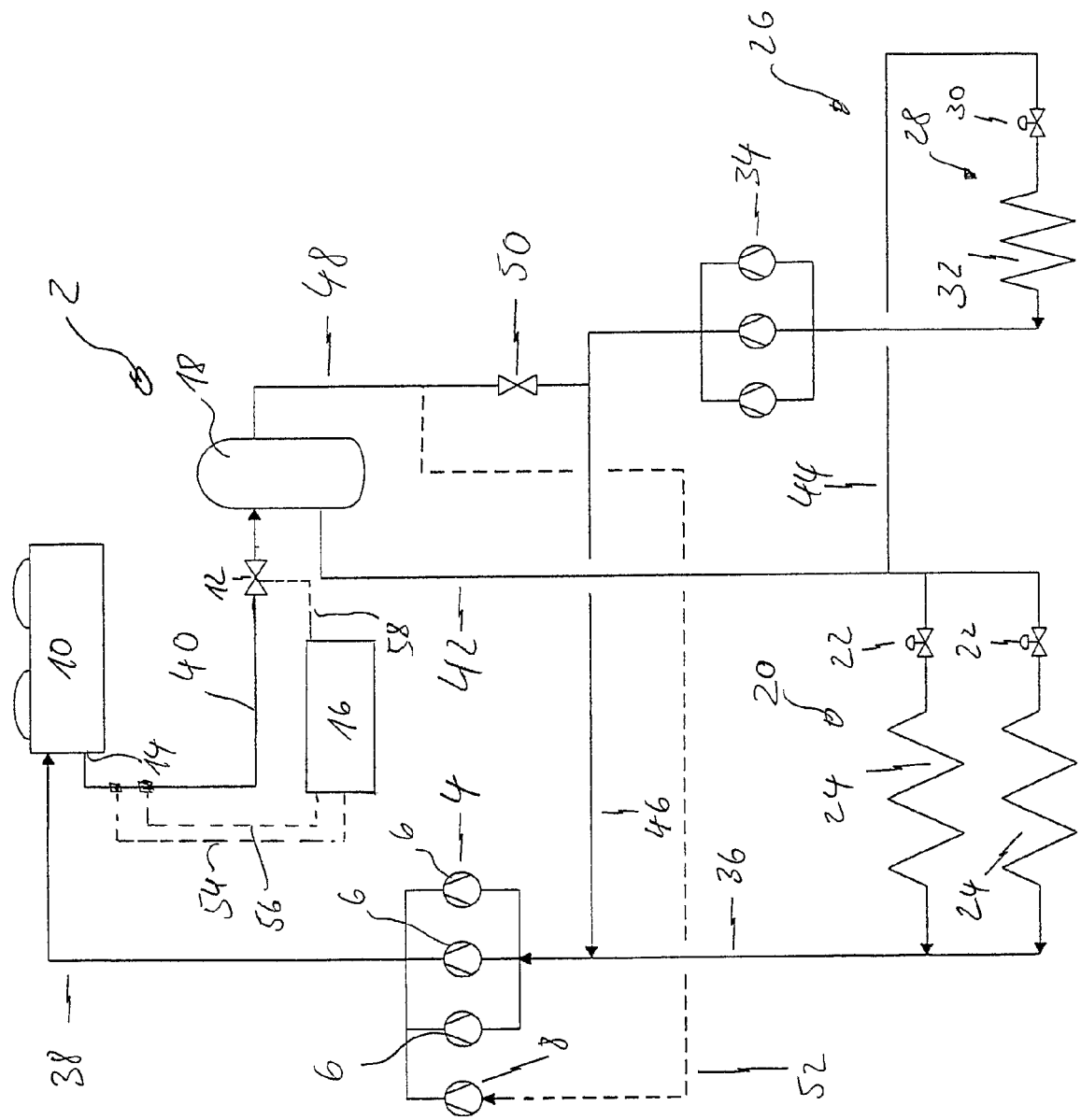
FIG. 1 shows a refrigeration circuit which is an embodiment of the present invention.

FIG. 1 shows a refrigeration circuit 2 for circulating a refrigerant like $CO_2$ in a predetermined flow direction. This refrigeration circuit 2 can be operated in a subcritical mode, i.e. "winter mode", as well as in a supercritical mode, i.e. "summer mode". The refrigeration circuit comprises in flow direction a compressor 4, i.e. in the particular embodiment a set of individual compressors 6, 8, a heat-rejecting heat exchanger 10, a control valve 12 which is associated to the outlet 14 of the heat-rejecting heat exchanger 10 and a control 16 for controlling the control valve 12 and possibly the complete refrigeration circuit 2.

The refrigeration circuit 2 further includes a receiver 18 and one or a plurality of refrigeration consumers 20 each comprising a consumer expansion device 22 as well as a consumer evaporator 24. The refrigeration consumers 20 are so-called "medium temperature" consumers, which in case of a supermarket refrigeration system application are display cabinets for milk products, meat, vegetables, fruits, etc., which require cooling temperatures above or around the freezing point. A "low temperature" refrigeration circuit 26 can alternatively or additionally be provided with low temperature refrigeration consumer(s) 28, each comprising a low temperature expansion device 30 and a low temperature evaporator 32. A set of low temperature loop compressors 34 raises the pressure of the refrigerant to the suction pressure of the multicompressor set 4. A suction line 36 connects the medium temperature refrigeration consumers 20 with the set of compressors 4. A high-pressure line 38 connects the output of the set of compressors 4 with the input of the heat-rejecting heat exchanger 10, and a heat exchanger outlet line 40 connects the outlet of the heat exchanger 10 to the receiver 18. A liquid line 42 connects the liquid portion of the receiver 18 with the refrigeration consumers 20 with a liquid branch line 44 connecting the low temperature refrigeration consumer 28. A return line 46 connects the output of the low temperature compressor set 34 with the suction line 36. A flash gas line 48 connects the gas portion of the receiver 18 via a flash gas expansion device 50 to the return line 46 and/or via flash gas return line 52 with compressor 8 in the compressor set 4.

In the refrigeration circuit 2 as shown in the present embodiment the control valve 12 serves as an intermediate expansion device for expanding the cooled high-pressure refrigerant to an intermediate pressure level within the receiver 18. Typically, in operation the discharged refrigerant in the high-pressure lines 38 is of relatively high pressure and high temperature. The high-pressure level in a typical $CO_2$ refrigeration circuit can be up to 120 bar and is typically approximately between 40 and 100 bar and preferably above 75 bar in the summer mode and between 40 and 70 bar and preferably approximately 45 bar in the winter mode. The intermediate pressure level normally is independent from summer and winter mode and between approximately 30 and 40 bar and preferably 36 bar. Also the pressure in the suction line 36 normally is independent from summer and winter mode and typically between 25 and 35 bar and preferably 28 bar.

A control 16 receives input information through lines 54 and/or 56. For example line 54 may provide temperature information of the refrigerant at the outlet 14 of the heat-rejecting heat exchanger 10 and the signal line 56 may provide pressure information. A further control line 58 provides control signals to the control valve 12. The control signals may be the desired pressure level to be maintained by the control valve 12, in case of a pressure regulating valve. Alternatively, control signals indicate the opening condition of the control valve 12, i.e. x % opening state with x % being between 0% (valve is closed) and 100% (valve is fully open). The control 16 calculates on the basis of the respective information, like temperature, characteristics of the refrigerant, etc., the respective control pressure depending on the operational mode and provides the respective information to the control valve 12 so that the correct pressure level will be maintained in the heat exchanger outlet line 40.

Figure 2:
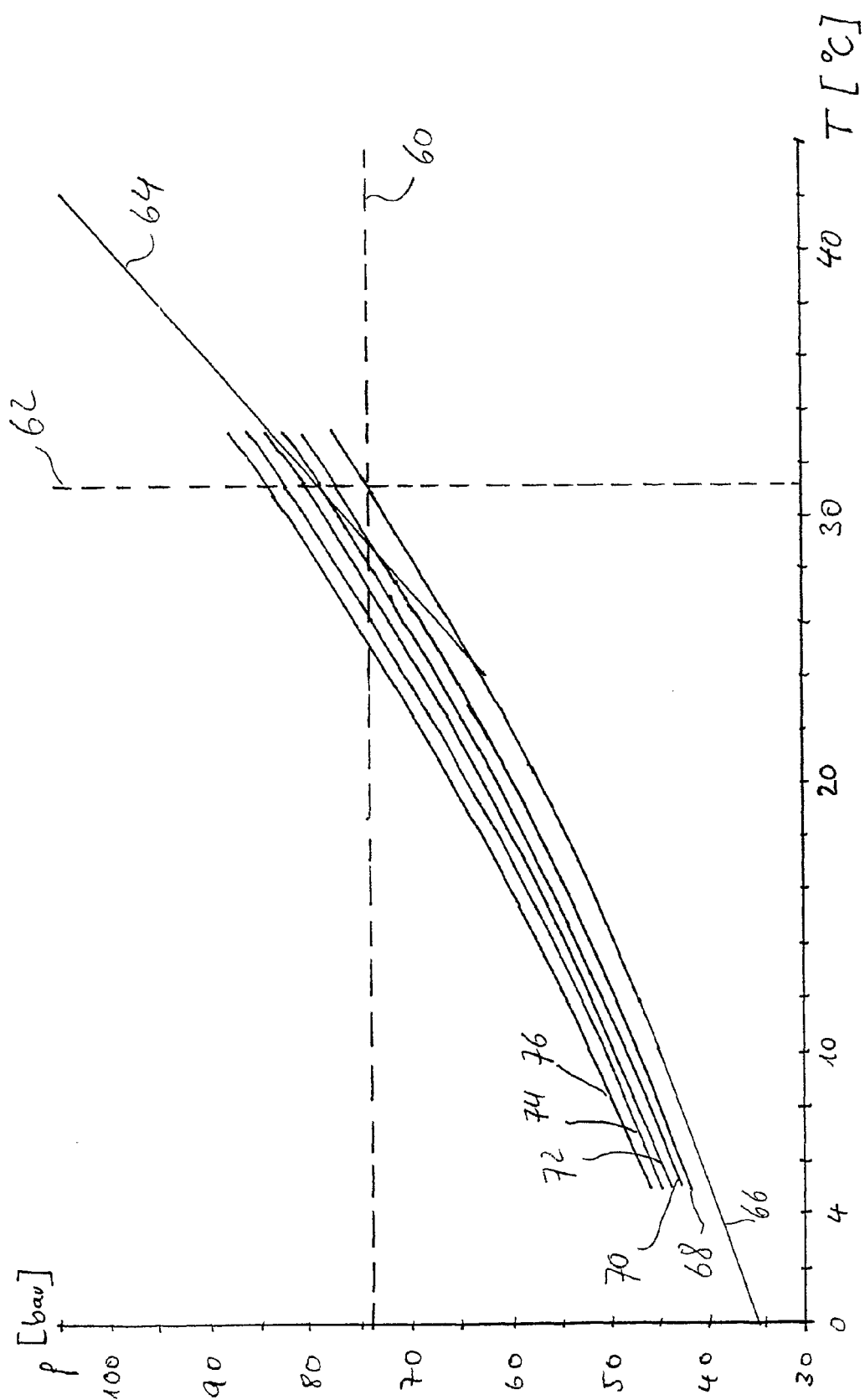
FIG. 2 is a p-T diagram for detailing an embodiment of the present invention.

FIG. 2 shows a p-T-diagram for a $CO_2$ refrigerant at the output 14 of the heat-rejecting heat exchanger and the control valve 12, respectively. FIG. 2 particularly shows with phantom line 60 the critical pressure at 73.8 bar of the $CO_2$ refrigerant and with phantom line 62 the critical temperature of 31.1° C. thereof. The intersection of phantom lines 60 and 62 is generally referred to as the "critical point". Curves 64, 66, 68, 70, 72, 74, and 76 show the desired pressure of the refrigerant dependent on the temperature. Particularly, curve 66 is the saturation pressure line of the $CO_2$ refrigerant with curves 68, 70, 72, 74, and 76 are corresponding curves, but with a sub-cooling of 2 Kelvin (=curve 68), 4 Kelvin (=curve 70), 6 Kelvin (=curve 72), 8 Kelvin (=curve 74), and 10 Kelvin (=curve 76) as compared to the saturation pressure curve 66. Curve 64 on the other hand indicates the theoretical pressure value in the supercritical state of the refrigerant for optimum COP (coefficient of performance), dependent on the temperature of the refrigerant.

One may note that the curve 64 for the supercritical pressure is extrapolated from the supercritical region into the subcritical region to the left side, while curves 66 to 76 for the subcritical pressure are extrapolated towards the supercritical region. Particularly the subcritical pressure curves 66 to 76 have no physical meaning beyond the critical point and particularly above the critical pressure. The situation is similar for the extrapolation of the supercritical pressure curve 64 into the subcritical region.

As one can see, the curve 64 for the supercritical pressure and the curve 66 for the saturation pressure in the subcritical region do not intersect at the critical point or near the critical point. Thus, if the control of the subcritical pressure is made on basis of curve 66 near the critical point and the control of the supercritical pressure is made based on curve 64 in the supercritical region near the critical point, there is a substantial pressure gap of nearly 10 bar so that if the temperature of the refrigerant varies around the critical temperature of 31.1° C., the pressure will jump back and forth between the subcritical pressure and the supercritical pressure, resulting in a discontinuity of the control. While for other sub-cooling temperatures, for example for 2 Kelvin sub-cooling or for 4 Kelvin sub-cooling, the intersection between the subcritical pressure curves 70, 72 and the supercritical pressure curve 64 moves towards the transition from the subcritical to the supercritical region, nevertheless such discontinuity exists.

In order to solve this discontinuity control problem, a border region next to the transition between the subcritical and the supercritical regions will be defined in accordance with an embodiment of the present invention. The border region can be defined between particular temperature values. It is also possible to define the border region as a region between particular pressure values. The width of such border region depends on the particular curves, the refrigerant, the amount of sub-cooling, etc., and may also depend on the particular method of determining the continuity pressure, i.e. interpolation, selection of the higher pressure value, etc. A typical width of the border region can be between 2 and 10 Kelvin. Particularly in the case of an intersection between the subcritical pressure curve and the supercritical pressure curve next to critical pressure, there is no need to actually define the limits of the border mode. In such a case it is possible to use the subcritical pressure curve in the temperature range below the intersection and the supercritical pressure curve when the temperature is above the intersection.

For example, if the subcritical pressure curve 72 (4 Kelvin sub-cooling) and the supercritical pressure curve 64 are used for controlling the high-pressure at the outlet 14 of the heat-rejecting heat exchanger, the intersection between those curves will be slightly below the critical temperature, at approximately 30.7° C., and the control of the control valve 12 will be performed based on the higher value for the subcritical pressure and the supercritical pressure, i.e. based on the subcritical pressure curve 72 for temperatures below 30.7° C. and on the basis of the supercritical pressure curve 64 for temperatures above such a value.

Figure 3:
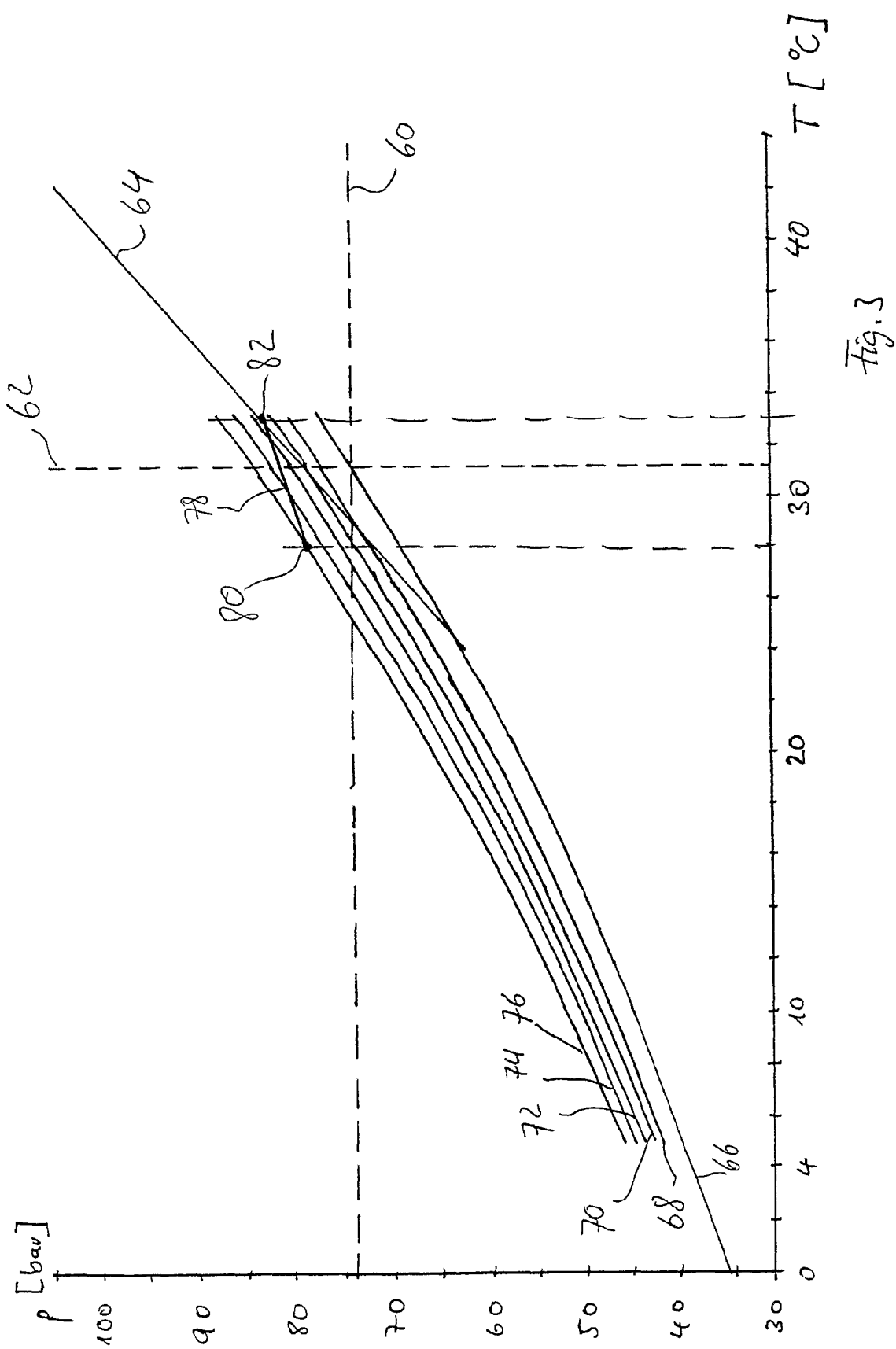
FIG. 3 is a p-T diagram similar to that of FIG. 2.

As an alternative example, if the pressure regulation should be made on the basis of subcritical pressure curve 76 (10 Kelvin sub-cooling) in the subcritical area and the supercritical pressure curve 64 in the supercritical area, there is apparently no intersection between such curves as far as they are shown in FIG. 2. An intersection might be substantially above the critical temperature. In such a case the definition of the "continuity pressure" on the basis of the "higher curve method" might not be functional. An alternative interpolation method may be used instead. To this effect a border region might be defined between 28 and 33° C. for example, and an continuity pressure curve 78 can be established between the intersection points 80 and 82 of the curve 76 with the lower limit of the border region and intersection point 82 between curve 64 and the upper limit of the boarder region (FIG. 3). It is to be noted that in the example of FIG. 3 the upper and lower border region limits are randomly selected. Other border region limits can also be used. In the example as shown in FIG. 3 the continuity pressure curve 78 is a straight line between intersection points 80 and 82.

Thus, in accordance with the embodiments of the invention as presented here, a continuous regulation of the high-pressure of the refrigerant at the outlet of the heat-rejecting heat exchanger 10 can be achieved.

The invention claimed is:

1. Method for controlling an intermittently supercritically operating refrigeration circuit (2) for circulating a refrigerant in a predetermined flow direction comprising in flow direction a compressor (4), a heat-rejecting heat exchanger (10), a control valve (12) associated to the outlet (14) of the heat-rejecting heat exchanger (10) and a control (16) for controlling the control valve (12), wherein, in order to achieve a continuous regulation of the high-pressure of the refrigerant at the outlet of the heat-rejecting heat exchanger, the method comprises the following steps:
   (a) in the subcritical mode, controlling the control valve (12) so that a predetermined "subcritical pressure" ensuring a predetermined sub-cooling of the liquid refrigerant at the outlet (14) of the heat-rejecting heat exchanger (10) is maintained;
   (b) in the supercritical mode, controlling the control valve (12) so that a predetermined "supercritical pressure", which is optimized for optimum efficiency, of the supercritical refrigerant at the outlet (14) of the heat-rejecting heat exchanger (10) is maintained; and
   (c) in a border mode in a border region next to the critical point, controlling the control valve (12) to maintain the outlet (14) of the heat-rejecting heat exchanger (10) at a "continuity pressure" which is determined on the basis of the predetermined "subcritical pressure" and the predetermined "supercritical pressure" of steps (a) and (b) and which continuity pressure continuously connects the subcritical pressure with the supercritical pressure.

2. Method according to claim 1, wherein the continuity pressure is determined in step (c) by determining the "subcritical pressure" and the "supercritical pressure" for the particular operational condition in accordance with steps (a) and (b) and selecting the higher pressure of the "subcritical pressure" and the "supercritical pressure".

3. Method according to claim 1, wherein the continuity pressure is determined in step (c) on the basis of an interpolation for the pressure values within the border region between the "subcritical pressure" at the lower limit of the border region and the "supercritical pressure" at the upper limit of the border region.

4. Method according to claim 1, wherein step (a) comprises determining the "subcritical pressure" based on the temperature and the characteristics of the refrigerant and by taking into account a subcooling of the refrigerant as compared to the saturation pressure.

5. Method according to claim 4, wherein the subcooling of the refrigerant as compared to the saturation pressure is up to 10K subcooling.

6. Method according to claim 1, wherein step (b) comprises determining the "supercritical pressure" based on the temperature of the refrigerant so that the coefficient of performance of the refrigeration circuit (2) is substantially at an optimum.

7. Method according to claim 1, wherein the control valve (12) is a pressure regulating valve and wherein dependent on the operational mode, the respective one of the "subcritical pressure", the "continuity pressure" and the "supercritical pressure" control the operation of the pressure regulating valve.

8. Refrigeration circuit (2) for circulating a refrigerant in a predetermined flow direction comprising in flow direction a compressor (4), a heat-rejecting heat exchanger (10), a control valve (12) associated to the outlet (14) of the heat-rejecting heat exchanger (10) and a control (16) wherein, in order to achieve a continuous regulation of the high-pressure of the refrigerant at the outlet of the heat-rejecting heat exchanger (10), the control 16 is adapted to control the control valve (12):
   (a) in the subcritical mode, so that a predetermined "subcritical pressure" ensuring a predetermined sub-cooling of the liquid refrigerant at the outlet (14) of the heat-rejecting heat exchanger (10) is maintained;
   (b) in the supercritical mode, so that a predetermined "supercritical pressure" which is optimized for optimum efficiency, of the supercritical refrigerant at the outlet (14) of the heat-rejecting heat exchanger (10) is maintained; and
   (c) in a border mode in a border region next to the critical point, to maintain the outlet (14) of the heat rejecting heat exchanger (10) at a "continuity pressure" which is determined on the basis of the predetermined "subcritical pressure" and the predetermined "supercritical pressure" of (a) and (b) and which continuity pressure continuously connects the subcritical pressure with the supercritical pressure.

9. Refrigeration circuit (2) according to claim 8, wherein the control valve (12) is a pressure regulating valve.

10. Refrigeration circuit (2) according to claim 8, wherein the control (16) is integrated with the control valve (12).

11. Refrigeration apparatus comprising a refrigeration circuit (2) of claim 8.

12. Method according to claim 4, wherein the subcooling of the refrigerant as compared to saturated pressure is between 2K and 6K subcooling.

13. Method for controlling an intermittently supercritically operating refrigeration circuit (2) for circulating a refrigerant in a predetermined flow direction comprising in flow direction a compressor (4), a heat-rejecting heat exchanger (10), a control valve (12) associated to the outlet (14) of the heat-rejecting heat exchanger (10) and a control (16) for controlling the control valve (12), wherein the method comprises the following steps:
   (a) in the subcritical mode, controlling the control valve (12) so that a predetermined "subcritical pressure" ensuring a predetermined sub-cooling of the liquid refrigerant at the outlet (14) of the heat-rejecting heat exchanger (10) is maintained;
   (b) in the supercritical mode, controlling the control valve (12) so that a predetermined "supercritical pressure", which is optimized for optimum efficiency, of the supercritical refrigerant at the outlet (14) of the heat-rejecting heat exchanger (10) is maintained; and
   (c) in a border mode in a border region next to the critical point, controlling the control valve (12) dependent on a "continuity pressure" which is determined on the basis of the predetermined "subcritical pressure" and the predetermined "supercritical pressure" of steps (a) and (b) by determining the "subcritical pressure" and the "supercritical pressure" for the particular operational condition in accordance with steps (a) and (b) and selecting the higher pressure of the "subcritical pressure" and the "supercritical pressure".

14. Method according to claim 13, wherein step (a) comprises determining the "subcritical pressure" based on the temperature and the characteristics of the refrigerant and by taking into account a subcooling of the refrigerant as compared to the saturation pressure.

15. Method according to claim 14, wherein step (b) comprises determining the "supercritical pressure" based on the temperature of the refrigerant so that the coefficient of performance of the refrigeration circuit (2) is substantially at an optimum.

16. Method according to claim 13, wherein step (b) comprises determining the "supercritical pressure" based on the temperature of the refrigerant so that the coefficient of performance of the refrigeration circuit (2) is substantially at an optimum.

17. Method according to claim 15, wherein the control valve (12) is a pressure regulating valve and wherein dependent on the operational mode, the respective one of the "subcritical pressure", the "continuity pressure" and the "supercritical pressure" control the operation of the pressure regulating valve.

18. Method according to claim 13, wherein the same continuity pressure as a function of temperature is used without regard to whether temperature is decreasing or increasing.

19. Method according to claim 1, wherein the same continuity pressure as a function of temperature is used without regard to whether temperature is decreasing or increasing.

20. Method according to claim 1, wherein the continuity pressure consists of a single pressure curve with continuous increase of pressure with temperature increase and decrease of pressure with temperature decrease.

21. Method according to claim 1, wherein the continuity pressure consists of a straight line with continuous increase of pressure with temperature increase.

* * * * *